E. A. STARKE.
REFINING PETROLEUM AND ITS BY-PRODUCTS.
APPLICATION FILED MAY 25, 1911.
1,109,187.
Patented Sept. 1, 1914.
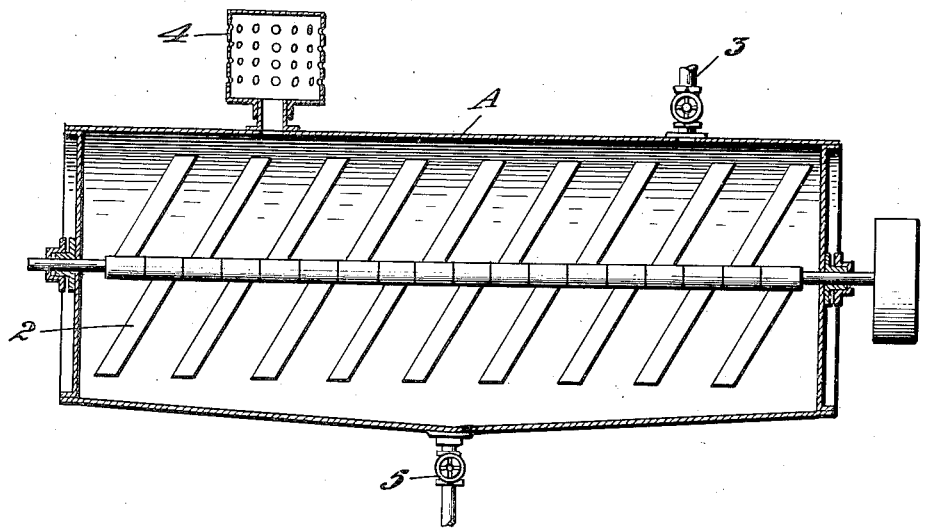

UNITED STATES PATENT OFFICE.

ERIC A. STARKE, OF BERKELEY, CALIFORNIA.

REFINING PETROLEUM AND ITS BY-PRODUCTS.

1,109,187.  Specification of Letters Patent.  Patented Sept. 1, 1914.

Application filed May 25, 1911. Serial No. 629,419.

*To all whom it may concern:*

Be it known that I, ERIC A. STARKE, a citizen of the United States, residing at Berkeley, in the county of Alameda and State of California, have invented new and useful Improvements in Refining Petroleum and Its By-Products, of which the following is a specification.

My invention relates to the refining of petroleum and its by-products, and consists especially in the method of separating the aromatic hydro-carbons from the petroleum and the manufacture of sulfonic acids. Its particular object is to devise means whereby a larger percentage of benzene or its homologues can be recovered than by former methods; and also to provide for the conservation and final recovery of the sulfur dioxid $SO_2$, generated in the process.

My method is applicable to those petroleums, the distillates of which contain a nucleus of the aromatic hydro-carbon series, by which I mean petroleum containing hydro-carbon having benzene or its homologues, either free or in some hydrogenized combination, such as hex-hydro-benzene, dihydro-xylene, for example, California or Japanese petroleum.

The refining of petroleum containing the aromatic series of hydro-carbons has always been accomplished by the use and excess of concentrated fuming or sulfuric acids, with or without the aid of heat. The use of fuming sulfuric acid or anhydrid, while more rapid, is attended by the formation of considerable quantities of sulfones as $(C_6H_5)_2SO_2$ and other complex combinations which render the extractions therefrom of benzene or its homologues, difficult. I have discovered that ordinary sulfuric acid, even 90% $H_2SO_4$ can be used for refining California petroleum under the condition that the reaction takes place in the presence of sulfur dioxid in a closed vessel, the sludge acid formed being frequently removed in order to remove the water formed and increase the concentration of the sulfur dioxid which is formed by the reaction. When fuming sulfuric acid is used in place of ordinary sulfuric acid, the quantity required is greatly reduced but the resulting production of benzene is not equal in quality to that obtained when ordinary sulfuric acid is used.

In the refining of California distillates which contain a high percentage of the aromatic series, the action of sulfuric acid is twofold, namely, oxidization and combination. The distillates are heated in order to promote the action of the acid. The exact nature of the chemical reaction that takes place is not thoroughly understood, except that it is one of oxidation resulting principally in the formation of sulfonic acids, water and $SO_2$. Between 16% and 30% of the sulfuric acid is reduced to $SO_2$. The $SO_2$ escapes and the water formed by the reaction and that released by the reduction of the sulfuric acid is absorbed by a portion of the unaltered sulfuric acid. The water thus formed acts as a diluent and tends to hinder the further progress of the reaction. In the ordinary method of refining petroleum, the reaction between the acids and the distillates is carried on in an apparatus known as an agitator; the $SO_2$ being removed as formed. The water of reaction, however, is left behind and tends to dilute and prevent the remaining acid from further action. I have discovered that if the sulfuric acid reacts upon the oil in a confined space the $SO_2$ formed remains in solution with the oil and accelerates the action of the acid in some manner not thoroughly understood thereby effecting economy in the use of sulfuric acid and furthermore effecting a saving by the recovery of the $SO_2$ at the end of the reaction. Therefore, I propose conserving the $SO_2$ through repeated cycles of operation till the reaction is complete, thereby effecting an economy in time and in the use of sulfuric acid.

My invention consists specifically in the removal of the aromatic hydro-carbon with the use of ordinary acids by the following steps and means:

1. I take a quantity of California oils, or oils containing the aromatic nucleus, such as California or Japanese oil, say 100 gallons.

2. Heat this oil from 150° to 200° F., with or without agitation; the degree of heat and the amount of agitation depending on the nature of the distillate. The heating of this oil is merely incidental to the main process and is for the purpose of facilitating the actions of the acids later added. Under some circumstances the heating can even be dispensed with, only it will require a little more acid.

3. Mix therewith 50 lbs. of acid of about 95% $H_2SO_4$, agitating the same rapidly in a closed vessel, preferably a closed, centrifugal machine or pump. The purpose of using a closed vessel wherein to carry on the operation of agitation is to prevent the escape of the $SO_2$ evolved by the reaction of the acid on the oil by confining this gas within the body of the oil to prevent the dilution of the acid, above referred to. The apparatus herein illustrated is a very satisfactory form to use for the purpose of retaining the gases in the mixture until the reaction is over. This mixing should be proceeded with as rapidly as possible, so as to avoid any considerable loss of the $SO_2$. Experience shows that this mixing takes about 20 minutes when the mixing is sufficiently rapid, say a speed of from 500 to 1000 revolutions per minute in a centrifugal machine. It may be determined when the reaction is over by testing the specific gravity of the oil. That is to say, if the oil to be treated originally has a specific gravity of 40 degrees Baumé the action of the acid will decrease it to 41 Baumé; this treatment is continued until all of the aromatics are removed; when all are removed the specific gravity of the oil remains fixed.

4. The separation complete, the mixture is allowed to settle for a few minutes, usually a quarter of an hour sufficing, when it will be found that the mixture has separated into two layers, the lower one being a tarry liquid containing the sulfonic acids and the upper being petroleum containing sulfurous acid or sulfur dioxid in solution. The tarry liquid is then drawn off and treated to give up its benzene and other products according to the method outlined in my previous Patent #913,780, dated March 2, 1909.

5. The petroleum stratum with its sulfur dioxid is then subjected to further treatment according to my present method and purposes, as follows: The process, as outlined above, of adding fresh acid and agitating in a closed vessel is repeated; the separation after each cycle taking place and the petroleum stratum being put through the process as many times as may be necessary to remove all the aromatic hydro-carbons. It may take four or five cycles of operation to remove the last traces of the aromatic hydrocarbons. As a rule the greater number of repetitions is preferred because it lessens the amount of acids required. As a result of the reaction between the acid and the oil between 16% to 30% of all the acid is reduced to $SO_2$. All of this $SO_2$, or nearly all of the quantity, is stored up in the oil, by reason of the carrying on of the process in closed vessels, or vessels which are sufficiently inclosed to prevent the escape of, or volatilization of the $SO_2$ out of the oil. Therefore when all the cycles of agitation have been performed this $SO_2$ is stored up in some form of solution in the oil, as an active agent. The oil which remains, after these repeated cycles of operation have been gone through and all the aromatic hydrocarbons removed, is subjected to a process by which the $SO_2$ which is held in suspension can be recovered.

6. The next step is the removal or recovery of this $SO_2$ from the oil residue and I accomplish this by putting the oil into a suitable vessel and blowing air or steam therethrough; the air or steam taking up all the $SO_2$ which is condensed by the ordinary chamber process and recovered as sulfurous acid.

The drawing represents an apparatus for the practice of the invention, in which A is a drum provided with rapid, revolving beaters 2, having a liquid inlet 3, an air escape 4 and a sludge cock 5.

Having thus described my invention, what I claim and desire to secure by Letters Patent is—

1. The method of treating oils containing a nucleus of the aromatic hydrocarbon series which consist in adding to such oils a suitable quantity of sulfuric acid and subjecting the mixture to agitation in a closed vessel until the specific gravity of the oil becomes constant and no longer decreases upon the addition of sulfuric acid, but retaining the sulfur dioxid within the body of the oil and preventing its escape therefrom, and allowing the mass to settle until the sulfonic acids have separated from the petroleum.

2. The method of treating oils containing a nucleus of the aromatic hydrocarbon series which consists in adding to such oils a suitable quantity of sulfuric acid and subjecting the mixture to agitation in a closed vessel until the specific gravity of the oil becomes constant and no longer decreases upon the addition of a sulfur acid, but retaining the sulfur dioxid within the body of the oil and preventing its escape therefrom, allowing the mass to settle until the sulfonic acids have separated from the petroleum, and then recovering the benzene from the sulfonic acids and the sulfur dioxid from the petroleum.

3. The method of treating oils containing a nucleus of the aromatic hydrocarbon series which consist in adding to such oils a suitable quantity of sulfuric acid and subjecting the mixture to agitation in a closed vessel until the specific gravity of the oil becomes constant and no longer decreases upon the addition of sulfur acid, but retaining the sulfur dioxid within the body of the oil and preventing its escape therefrom, allowing the mass to settle until the sulfonic acids have separated from the petroleum, drawing off the sulfonic acids and repeating the cycle with the remaining petroleum with its sulfur dioxid.

4. The method of treating petroleum distillate containing a nucleus of the aromatic hydrocarbon series, which consists in adding to such oils a suitable quantity of sulfuric acid and subjecting the mixture to agitation in a closed vessel in the presence of heat until the specific gravity of the oil becomes constant and no longer decreases upon the addition of sulfuric acid, but retains the sulfur dioxid generated as a result of interaction between the ingredients within the body of the oil.

5. The process of treating oils which consists in mixing distillates of petroleum containing a nucleus of the aromatic hydrocarbon series, saturating the same with $SO_2$ and then treating this mixture with sulfuric acid subjecting the mixture to rapid agitation in a closed vessel so as to retain within the oil the $SO_2$.

In testimony whereof I have hereunto set my hand in the presence of two subscribing witnesses.

ERIC A. STARKE.

Witnesses:
 JOHN H. HERRING,
 CHARLES EDELMAN.